United States Patent Office 2,768,926
Patented Oct. 30, 1956

2,768,926

CUMENE HYDROPEROXIDE INSECT REPELLENT COMPOSITIONS AND METHOD

Lyle D. Goodhue, Bartlesville, Okla., assignor to Phillips Petroleum Company, a corporation of Delaware No Drawing. Application January 2, 1952,
Serial No. 264,644

6 Claims. (Cl. 167—30)

This invention relates to a method and a composition for repelling insects such as roaches. In one of its aspects, it relates to the rendering of an area repellent to insects. In another aspect, it relates to an insect repellent area.

Insects such as roaches, flies and others are troublesome pests in homes, restaurants, grocery stores, and the like, especially in warm climates where out-of-door infestation is present all year.

It has now been discovered that cumene hydroperoxide is an effective agent for repelling insects such as roaches from surfaces frequented by them when applied to said surfaces in suitable form, such as solution, dust, or the like.

According to the invention, insect repellents and a method for repelling insects are provided using cumene hydroperoxide.

In the preferred form of the invention a composition is prepared, and applied, comprising cumene hydroperoxide in a solvent or a carrier of low volatility or a volatility such that the highest concentration of the active ingredient does not exceed eighty percent for sake of safety. Thus, while carriers of high volatility can be employed for application of the repellent of the invention, it should be noted that the release of the pure compound can result, under some circumstances, in the creation of hazard. In view of this hazard it is preferred to never apply the pure compound or repellent, as such, or dissolved in a solvent or carrier of high volatility only. The best mode of application is to employ a low volatility solvent which can be further diluted for purposes of application with a high volatility solvent.

The repellent material of this invention can be applied for the intended purpose in several ways, as a solution, dust, emulsion, aerosol, as a concentrate in which prepared, or in other manner. A preferred method of application is to spray a liquid composition on a surface from which insects such as roaches are to be repelled. At least 0.4 gram of the active ingredient per 100 square feet of surface will be applied. Generally about 1 to 10 grams of the active ingredient per 100 sq. ft. of surface is advantageously applied. Larger amounts can be applied as desired.

Solvents or carriers which I have found applicable in the present invention include those which have no detrimental effect upon the repellent activity of my materials. Suitable solvents or carriers include petrolatum, deodorized kerosene, naphthas, and other hydrocarbons boiling above atmospheric temperatures. As indicated above, solvents or carriers of relatively low volatility should be employed; however, more highly volatile carriers, employed alone, are excluded only for safety precautions. Solid inert carrier materials such as talc, bentonite, kieselguhr, pyrophyllite, and the like can be utilized in the preparation of dusts or powders. An especially noted repellent composition according to this invention is one in which the repellent is suspended in paraffin or like material. The paraffin can be incorporated in the solvent in which the repellent is applied or it can be placed upon the area or situs to which the repellent dissolved or otherwise suspended in a solvent is applied.

When employing the active repellent ingredient in a non-volatile solvent or in a dust composition, a preferred minimum concentration of about 10 wt. percent should be maintained. When employing the active repellent ingredient in a volatile solvent or carrier, the lower effective limit of the ingredient concentration is about 0.5 wt. percent. If desired, repeated sprayings with solutions of lesser concentration can be made in order to build up a sufficient amount of active ingredient on a surface to repel insects such as roaches therefrom. There is no upper limit to the concentration that can be employed except the limits of solubility in the solvent employed, and that observed for reasons of safety as above indicated.

My invention is advantageously applied to repelling the roach species, German cockroach, *Blatella germanica* (Linné), American cockroach, *Periplaneta americana* (Linné), Oriental cockroach, *Blatta orientalis* (Linné) and brown-banded cockroach, *Supella supellectilium* (Serville). These species of roaches are common household pests and frequent artificial or man-made surfaces, as for example floors, cupboards, and wall crevices associated with domestic units, hospitals, restaurants, grocery stores and the like.

The peroxide used in the present invention is known in the art.

The following are examples of roach repellent compositions made according to the present invention:

EXAMPLE I

A 75 percent concentrate of cumene hydroperoxide in the parent hydrocarbon was diluted with acetone to provide a solution containing one percent of the hydroperoxide. Upon evaporation of the acetone there remained up to about 25 percent or more of non-peroxidic material.

*Chematropic studies*

EXAMPLE II

The repellent effect of materials on roaches was determined by taking advantage of the fact that roaches seek shelter from light. Ten roaches, usually young adults, were confined in a screened cage which contained two shelters, one treated with a candidate repellent and one untreated. These shelters were inverted lidless one-pint paraffin impregnated paper cartons with notches cut in the rim to allow entrance to the roaches. Five cubic centimeters of a one percent solution of the candidate repellent was put into one carton and the carton revolved until the inside was evenly coated and the acetone had evaporated.

Repellent materials cause the roaches to gather in the untreated carton.

A test was set up according to the procedure described above and observations made over a three-day period. Results of the test, in which a 70–75 percent concentrate of cumene hydroperoxide was employed and in which the amount, deposited upon the carton, as above described, was approximately 50 milligrams, over the three-day observation period, indicated a 100 percent repellent effectiveness.

EXAMPLE III

Roaches are known to prefer hiding places previously inhabited by themselves. Using this fact, a test was set up wherein a paraffined carton previously inhabited by roaches was treated with the candidate repellent and observations made over a three-day period to determine the effectiveness with which said repellent overcame the roachy odor. In the test there was employed a cumene hydroperoxide concentrate (70–75 percent) and the amount deposited on the carton was approximately 50 milligrams. Roachy odor was overcome and the carton was effective 100 percent over the three-day observation period.

In the preceding examples the compound referred to as cumene hydroperoxide is more formally named α,α'-dimethylbenzyl hydroperoxide. It can also be named phenyl(dimethyl)hydroperoxymethane, and has the structural formula

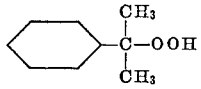

Reasonable variation and modification are possible within the scope of the foregoing disclosure and the appended claims to the invention, the essence of which is an insect repellent which will even repel roaches and overcome roachy odor has been discovered and set forth thus enabling the art to produce insect, especially roach, repellent areas.

I claim:

1. A method of repelling an insect which comprises applying to the place from which the insect is to be repelled a repellent comprising cumene hydroperoxide in an amount effective to repel said insect.

2. A method of repelling an insect from an area which comprises applying at least 0.4 gram per 100 square feet of area of cumene hydroperoxide.

3. A method of repelling an insect from a substantially closed space which comprises applying at least 1-10 grams per 100 square feet of an area within said space of cumene hydroperoxide.

4. A method of repelling roaches from a substantially closed space which comprises placing on the surface of an area within said space and likely to be inhabited by roaches, cumene hydroperoxide in an amount effective to repel said roaches.

5. A method for overcoming roachy odor at a place priorly inhabited by roaches which comprises applying to said place, cumene hydroperoxide in an amount effective to overcome said odor.

6. A composition repellent to insects which contains as an essential active ingredient, cumene hydroperoxide, and a solid carrier therefor selected from the group consisting of a paraffinic hydrocarbon material which is substantially non-flowing at ambient temperature, and a solid, sub-divided powder inert with respect to said active ingredient, said active ingredient being present in said paraffinic hydrocarbon material in an amount sufficient to yield a final repellent composition, upon evaporation of any volatile material at the area of application, comprising a suspension of said compound in said paraffinic hydrocarbon material, said cumene hydroperoxide being present in said powder in an amount sufficient that upon application of the powder composition, it will render the place of application repellent to insects.

References Cited in the file of this patent
FOREIGN PATENTS
393,449   Germany _____ Apr. 3, 1924